United States Patent Office 2,878,201
Patented Mar. 17, 1959

2,878,201

POLYESTER COMPOSITION AND PROCESS OF MAKING SAME

Arthur B. Beindorff and Hobson D. De Witt, Decatur, Ala., assignors to The Chemstrand Corporation, Decatur, Ala., a corporation of Delaware No Drawing. Application January 9, 1956
Serial No. 557,849

19 Claims. (Cl. 260—30.4)

This invention relates to new compositions of matter and more particularly to new and useful compositions of matter comprising solutions or "dopes" of synthetic linear condensation polyesters. It is further concerned with new compositions of matter which are capable of being formed into useful articles, such as ribbons, films, bristles, fibers, filaments, foils and the like.

The synthetic linear condensation polyesters contemplated in the practice of the invention are those formed from aromatic dicarboxylic acids and glycols, and their copolyesters. In a highly polymerized condition, these polyesters and copolyesters can be formed into filaments, and the like, then subsequently oriented permanently by cold drawing. The polyesters and copolyesters particularly useful in the instant invention are those resulting from heating one or more of the glycols of the series $HO(CH_2)_nOH$, in which $n$ is an integer greater than one but not more than 10, with a dicarboxylic acid, such as terephthalic or isophthalic acid or an ester-forming derivative thereof.

Among the ester-forming derivatives of terephthalic and isophthalic acid are their aliphatic and cycloaliphatic aryl esters and half esters, ammonium and amine salts, and their acid halides. Examples of the glycols which may be employed in practising the instant invention are ethylene glycol, trimethylene glycol, tetramethylene glycol, and decamethylene glycol. Other aromatic dicarboxylic acids and derivatives which may be used are p-carboxyphenylacetic acid, succinic acid, p,p'-dicarboxybiphenyl, p,p'-dicarboxycarbanilide, p,p'-dicarboxythiocarbanilide, p,p'-dicarboxydiphenylsulfone, p-carboxyphenoxyacetic acid, p-carboxyphenoxypropionic acid, p-carboxyphenoxybutyric acid, p-carboxyphenoxyvaleric acid, p-carboxyphenoxyhexanoic acid, p-carboxyheptanoic acid, p,p'-dicarboxydiphenylmethane, p,p'-dicarboxydiphenylethane, p,p'-dicarboxydiphenylpropane, p,p'-dicarboxydiphenylheptane, p,p'-dicarboxydiphenyloctane, p,p'-dicarboxydiphenoxyethane, p,p' - dicarboxydiphenoxyropane, p,p'-dicarboxydiphenoxybutane, p,p'-dicarboxydiphenoxypentane, p,p'-dicarboxydiphenoxyhexane, 3-alkyl-4-(beta-carboxy ethoxy) benzoic acid, etc. Polyethylene terephthalate, however, is preferred because of the ready availability of terephthalic acid and ethylene glycol, from which it is made. It also has a relatively high melting point of about 250.5° C., and this property is particularly desirable in the manufacture of filaments in the textile industry.

For the sake of simplicity, the present invention will be described as it is applied in the manufacture of fibers and filaments. However, the invention is not to be limited thereby except insofar as it may be limited by the appended claims.

Various methods are known for converting the polyesters described above into filaments and fibers, such as the so-called melt-spinning, wet-spinning, and dry-spinning methods.

Melt-spinning comprises melting chips of the polyester on a heated grid and passing the melt through a filter bed of small particles, such as sand. Subsequently, the melt is forced through a spinneret and the filaments so formed are cooled. However, melt-spinning has certain disadvantages, such as the employment of high temperatures which makes the addition of plasticizers and modifying agents difficult, because there is a tendency for the added agents to discolor and decompose.

The wet-spinning method in which a solution of the polyester is extruded into a bath containing a non-solvent for the polyester has a number of advantages over the melt-spinning method. For example, the wet-spinning method is generally more economical and can be carried out at lower temperatures. Therefore, plasticizers and other agents may be added with a minimum tendency toward discoloration and decomposition. Furthermore, certain types of plasticizers and modifying agents tend to be less compatible for blending in a melt at high temperatures, whereas they can be readily incorporated in a polyester solution at a low temperature. Solutions offer the further advantage in that they may be easily cast into films or coatings of uniform thickness. This is extremely difficult with a molten composition because of its relatively high viscosity.

The wet-spinning technique, however, has not been employed commercially because of the lack of suitable solvents. Generally, polyesters are insoluble in the more common organic solvents. From the standpoint of low cost, solvent power, non-corrosiveness and ease of recovery, there is a scarcity of suitable solvents for the more usual types of polyesters.

In the dry-spinning method, the polyester solution is extruded through a spinneret into a heated atmosphere which disposes of the volatile solvent.

Accordingly, the principal object of the instant invention is the preparation of polyester solutions or "dopes" which are capable of being transformed into shaped articles by the wet-spinning method or the dry-spinning method.

Another object is to provide synthetic linear condensation polyester compositions in solutions which are stable and have non-gelation characteristics.

Another object of the invention is to prepare spinnable solutions of polyester compositions.

Other objects and advantages will be evident from the following description.

The foregoing objects are accomplished by dissolving the synthetic linear condensation polyesters in N-acetyl morpholine, N-methyl pyrrolidone and N-(alpha-aminopropyl) morpholine or dissolving the synthetic linear condensation polyesters in an N-substituted compound selected from the group consisting of these compounds and phenols, such as phenol, chlorophenols, metacresol, resorcinol and the like.

Solutions of high solids content and good stability can be prepared by mixing the polyester in the compounds mentioned above or mixtures of these compounds and phenols and heating to a temperature in the range of 130° C. to the boiling point of the mixture.

When preparing a solution of a polyester in a solvent mixture the compounds may be employed in the range of 97% to 50% based on the weight of the total solvent and phenols in the range of 3% to 50%.

In accordance with the present invention, solutions or "dopes" containing from 10% to 25% by weight of polyester are suitable for the formation of fibers and filaments.

The maximum solids concentration of the polyesters that can be obtained in solution and the viscosity of the solution depend upon the nature of the polymer or polyester, the solvent used, and the temperature. In the manufacture of filaments and fibers a polyester having a molecular weight of at least 10,000 is employed in making a solution. Lower molecular weight polyesters may be used when the solution is to be employed as a coating or as a lacquer.

The polyesters contemplated in the practice of the present invention are those prepared from aromatic dicarboxylic acids, such as terephthalic acid, and glycols, such as ethylene glycol, or modifications of these polyesters with chain terminating agents having hydrophilic properties, such as the mono-functional ester-forming polyethers bearing the general formula, (I) $\quad R-O[(CH_2)_mO]_x(CH_2)_n-OH$ and in which R is an alkyl group containing 1 to 4 carbon atoms, $m$ and $n$ are integers from 1–22 and $x$ is a whole number indicative of the degree of polymerization, that is, $x$ could be an integer from 1–100 or greater. Examples of such compounds are methoxypolyethylene glycol, ethoxypolyethylene glycol, n-propoxypolyethylene glycol, isopropoxypolyethylene glycol, t-butoxypolyethylene glycol, etc. Another excellent chain terminating compound is polyvinylmethyl ether. Modifications may also be brought about by the use of cross-linking agents together with the chain terminating groups. The cross-linking agents contemplated in modifying the polyesters of the instant invention are polyfunctional acids and alcohols with a functionality greater than 2, or their simple derivatives. The acids and their derivatives are compounds bearing the general formula, (II)

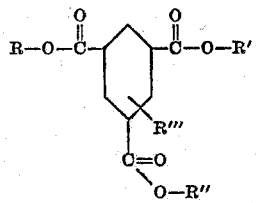

and in which R, R' and R'' are alkyl groups having 1–3 carbon atoms and R''' is hydrogen or alkyl groups having 1–2 carbon atoms. Among such compounds are trimethyl trimesate, tripropyl trimesate, and ring alkylated esters of benzene 1,3,5-tricarboxylic acids, etc. The polyfunctional alcohols or their simple derivatives which may be used as cross-linking agents are the saturated aliphatic or cycloaliphatic polyvalent alcohols containing only C, H, and O, having 3–6 carbon atoms and in which $n$ is greater than two, the general formula being, (III) $\quad (R)(OH)_n$ where R is a saturated aliphatic group or a cycloaliphatic group. Examples of such compounds are pentaerythritol, sorbitol, glycerol, mannitol, etc. Further polyesters contemplated in the practice of the present invention are those such as copolymers of polyethylene terephthalate and polyethylene isophthalate modified with both the chain terminators and cross-linking agents mentioned above.

The polyester compositions described herein are particularly adapted for use in the manufacture of shaped articles, such as filaments, fibers, films, and the like by the wet-spinning or the dry-spinning processes. In forming filaments by the wet-spinning method, the polyester solution is extruded through a spinneret which in turn is submerged in a coagulating bath containing a non-solvent for the polyester. Where the dry-spinning method is employed, the polyester is extruded through a spinneret and the resulting filament is subjected to a heated atmosphere to remove the volatile solvent.

If it is desired to produce shaped articles from the polyester solutions of the present invention which have a modified appearance or modified properties, various agents to accomplish these effects may be added to the polyester solutions prior to fabrication of the articles without any ill effects thereon. Such added agents might be plasticizers, pigments, dyes, antistatic agents, fire-retarding agents, etc.

The following examples are intended to illustrate the new compositions of the invention more fully, but are not intended to limit the scope of the invention, for it is possible to effect many modifications therein. In the examples, all parts and percents are by weight unless otherwise indicated.

*Example I*

9 grams of N-acetyl morpholine and 1 gram of polyethylene terephthalate were mixed together and warmed with stirring to 130° C., where the mixture readily dissolved yielding a solution suitable for both wet-spinning and dry-spinning.

*Example II*

9 grams of N-acetyl morpholine and 1 gram of polyethylene terephthalate modified with 10% of ethoxypolyethylene glycol were mixed together and warmed with stirring to 130° C., where the mixture readily dissolved yielding a solution suitable for both wet-spinning and dry-spinning.

*Example III*

9 grams of N-acetyl morpholine and 1 gram of polyethylene terephthalate modified with 20% of ethoxypolyethylene glycol were mixed together and warmed with stirring to 130° C., where the mixture readily dissolved yielding a solution suitable for both wet-spinning and dry-spinning.

*Example IV*

9 grams of N-methyl pyrrolidone and 1 gram of polyethylene terephthalate were mixed together and warmed with stirring to 130° C., where the mixture readily dissolved yielding a solution suitable for both wet-spinning and dry-spinning.

*Example V*

9 grams of N-methyl pyrrolidone and 1 gram of polyethylene terephthalate modified with 10% of ethoxypolyethylene glycol were mixed together and warmed with stirring to 130° C., where the mixture readily dissolved yielding a solution suitable for both wet-spinning and dry-spinning.

*Example VI*

9 grams of N-methyl pyrrolidone and 1 gram of polyethylene terephthalate modified with 20% of ethoxypolyethylene glycol were mixed together and warmed with stirring to 130° C., where the material readily dissolved yielding a solution suitable for both wet-spinning and dry-spinning.

*Example VII*

7 grams of N-(alpha-aminopropyl) morpholine and 1 gram of phenol were mixed with 2 grams of polyethylene terephthalate and warmed with stirring to 140° C. where the polymer dissolved yielding a clear, gel-free solution suitable for both wet-spinning and dry-spinning.

*Example VIII*

9 grams of N-(alpha-aminopropyl) morpholine was mixed with 1 gram of polyethylene terephthalate and warmed with stirring to 170° C. where the polymer dissolved rapidly to give a solution suitable for wet-spinning and dry-spinning.

The polyester compositions of this invention can be usefully employed in the coating field, for example, in the coating of textile fabrics. Thus a fabric can be coated and/or impregnated with the polyester solutions described herein and then treated, that is soaked, in a non-solvent for the polyester in order to precipitate the polyester in and on the fabric. Metals, paper and impervious films may also be coated with the polyester compositions of this invention by conventional and well known procedures.

One of the principal advantages of the instant invention is that it provides polyester compositions which are readily convertible to useful shaped articles by the wet-spinning or dry-spinning methods which are more economical than the melt-spinning method. Numerous other advantages will be apparent to those skilled in the art from reading the instant description.

As many apparently widely different embodiments of this invention may be made without departing from the spirit or scope thereof, it is to be understood that the same is not to be limited to the specific embodiments thereof except as defined in the appended claims.

We claim:

1. A new composition of matter comprising a miscible mixture of a synthetic linear condensation polyester selected from the group consisting of (A) polyesters formed by the reaction of at least one aromatic dicarboxylic acid and at least one glycol of the series $HO(CH_2)_nOH$, where $n$ is an integer greater than one and not exceeding 10; (B) said polyesters modified by a chain terminator selected from the group consisting of substances having the general formula, (I) 

wherein R is an alkyl group containing 1 to 4 carbon atoms, $m$ and $n$ are integers from 1 to 22 and $x$ is an integer from 1 to 100 indicative of the degree of polymerization, and polyvinylmethyl ether; and (C) said polyesters modified by a chain terminator selected from the group consisting of substances having the general formula (I) and polyvinylmethyl ether and a cross-linking agent selected from the group consisting of compounds having the general formula, (II) 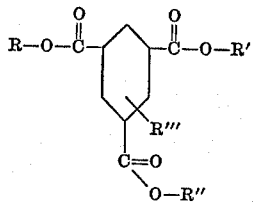

wherein R, R' and R" are alkyl groups containing 1 to 3 carbon atoms and R''' is selected from the group consisting of hydrogen and alkyl groups containing 1 to 2 carbon atoms, and compounds having the general formula, (III) 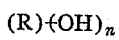

wherein R is selected from the group consisting of saturated aliphatic radicals and cycloaliphatic radicals, said radicals containing 3 to 6 carbon atoms and wherein $n$ is an integer greater than 2, and a solvent selected from the group consisting of N-acetyl morpholine, N-methyl pyrrolidone, N-(alpha-aminopropyl) morpholine, and mixtures of 97 to 50 percent of any of said N-substituted compounds and 3 to 50 percent of a phenol, based on the total weight of the solvent.

2. A new composition of matter as defined in claim 1 wherein the polyester is polyethylene terephthalate.

3. A new composition of matter as defined in claim 1 wherein the solvent is N-acetyl morpholine.

4. A new composition of matter as defined in claim 1 wherein the solvent is N-methyl pyrrolidone.

5. A new composition of matter as defined in claim 1 wherein the solvent is N-(alpha-aminopropyl) morpholine.

6. A new composition of matter as defined in claim 1 wherein the solvent mixture is N-acetyl morpholine and phenol.

7. A new composition of matter as defined in claim 1 wherein the solvent mixture is N-methyl pyrrolidone and metacresol.

8. A new composition of matter as defined in claim 1 wherein the solvent mixture is N-(alpha-aminopropyl) morpholine.

9. A new composition of matter as defined in claim 1 wherein the chain terminator is methoxypolyethylene glycol.

10. A new composition of matter as defined in claim 1 wherein the chain terminator is ethoxypolyethylene glycol.

11. A new composition of matter as defined in claim 1 wherein the chain terminator is polyvinylmethyl ether.

12. A new composition of matter as defined in claim 1 wherein the cross-linking agent is trimethyl trimesate.

13. A new composition of matter as defined in claim 1 wherein the cross-linking agent is tripropyl trimesate.

14. A new composition of matter as defined in claim 1 wherein the cross-linking agent is pentaerythritol.

15. A new fiber-forming composition comprising a homogeneous miscible mixture of 10% to 25% polyethylene terephthalate having a molecular weight of at least 10,000 and N-acetyl morpholine.

16. A new fiber-forming composition comprising a homogeneous miscible mixture of 10% to 25% polyethylene terephthalate having a molecular weight of at least 10,000 and N-methyl pyrrolidone.

17. A new fiber-forming composition comprising a homogeneous miscible mixture of 10% to 25% polyethylene terephthalate having a molecular weight of at least 10,000 and N(alpha-aminopropyl) morpholine.

18. A process for preparing a new composition of matter comprising mixing a synthetic linear condensation polyester selected from the group consisting of (A) polyesters formed by the reaction of at least one aromatic dicarboxylic acid and at least one glycol of the series $HO(CH_2)_nOH$, where $n$ is an integer greater than one and not exceeding 10; (B) said polyesters modified by a chain terminator selected from the group consisting of substances having the general formula, (I) 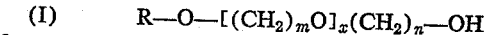

wherein R is an alkyl group containing 1 to 4 carbon atoms, $m$ and $n$ are integers from 1 to 22 and $x$ is an integer from 1 to 100 indicative of the degree of polymerization, and polyvinylmethyl ether; and (C) said polyesters modified by a chain terminator selected from the group consisting of substances having the general Formula I and polyvinylmethyl ether and a cross-linking agent selected from the group consisting of compounds having the general formula, (II) 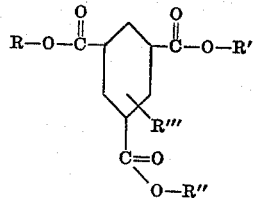

wherein R, R' and R" are alkyl groups containing 1 to 3 carbon atoms and R''' is selected from the group consisting of hydrogen and alkyl groups containing 1 to 2 carbon atoms, and compounds having the general formula, (III) 

wherein R is selected from the group consisting of saturated aliphatic radicals and cycloaliphatic radicals, said radicals containing 3 to 6 carbon atoms and wherein $n$ is an integer greater than 2 with a solvent selected from the group consisting of N-acetyl morpholine, N-methyl pyrrolidone, N-(alpha-aminopropyl) morpholine, and mixtures of any of said N-substituted compounds and 3 to 50 percent of a phenol, based on the total weight of the solvent and heating the mixture to a temperature in the range of 130° C. to the boiling point of the mixture.

19. A process for preparing miscible fiber-forming compositions which comprises mixing 10 to 25 percent, based on the weight of the mixture, of polyethylene terephthalate with N-acetyl morpholine and heating the mixture to a temperature in the range of 130° C. to the boiling point of the mixture to form a homogeneous solution.

References Cited in the file of this patent

UNITED STATES PATENTS 2,497,376  Swallow et al. _____ Feb. 14, 1950

FOREIGN PATENTS 645,032  Great Britain _____ Oct. 25, 1950